United States Patent [19]

Brann

[11] Patent Number: 4,502,422
[45] Date of Patent: Mar. 5, 1985

[54] HIGH OUTPUT OIL COOLED FLOATING PISTON

[75] Inventor: David E. Brann, Lemont, Ill.

[73] Assignee: General Motors Corporation, Detroit, Mich.

[21] Appl. No.: 453,748

[22] Filed: Dec. 27, 1982

[51] Int. Cl.³ .............................................. F01P 3/06
[52] U.S. Cl. .............................. 123/41.35; 123/193 P
[58] Field of Search ................ 123/41.35, 193 P, 279

[56] References Cited

U.S. PATENT DOCUMENTS 3,240,193  3/1966  Ephraim et al. ................. 123/41.35

FOREIGN PATENT DOCUMENTS 963752  4/1972  Canada .

Primary Examiner—Charles J. Myhre
Assistant Examiner—David A. Okonsky
Attorney, Agent, or Firm—Robert J. Outland

[57] ABSTRACT

An oil cooled piston particularly for two cycle direct injection diesel engines offers improved cooling through increasing of the combustion bowl rim radius and modifications to the understructure to provide alternate perforate gussets permitting an increased number of rim cooling ribs. An angular break from the rim radius to the squish land offsets efficiency impairment from the larger rim radius.

5 Claims, 8 Drawing Figures

HIGH OUTPUT OIL COOLED FLOATING PISTON

TECHNICAL FIELD

This invention relates to pistons for internal combustion engines particularly of the two stroke cycle high output diesel type. More specifically, the invention relates to a high strength oil cooled floating piston member having integral crown supporting gussets and cooling ribs with modifications for improving cooling in the combustion bowl rim radius without adversely affecting engine combustion efficiency.

BACKGROUND

The development of pistons for a well known series of two cycle diesel engines manufactured for use in railway locomotives and other applications has extended over many years. Continuing modifications in the engine design, involving among other things higher power output per cylinder, have created increasingly severe operating requirements of pressure and temperature which have from time to time required modifications in piston design to maintain the record of extended durability desired. Considerable background information about the history and development of pistons for engines of this type is found in U.S. Pat. No. 3,240,193 issued Mar. 15, 1966, corresponding Canadian patent No. 771,421 issued Nov. 14, 1967 and Canadian patent No. 963,752 issued Mar. 4, 1975, all assigned to the assignees of the present invention.

A prior piston design, shown in the Canadian No. 963,752 patent provided an oil cooled floating piston construction having a thin walled crown including a recessed combustion bowl surrounded by a rim defining a squish land. The rim portion of the crown was connected with a cylindrical wall including an annular heat dam of limited cross section, a ring belt and a side thrust absorbing cylindrical skirt portion.

The prior piston design provided rigidity in the crown and ring belt structure through use of a plurality of thin radially extending nonperforate gussets connecting an internal thrust collar directly with the interior bowl and rim portions of the piston crown and the heat dam and ring belt portions of the skirt-defining cylindrical wall. Additional cooling fins provided between gussets in the rim and heat dam area joined with the gusset structure to carry heat from the connected surfaces of the piston rim and combustion bowl for transmission to cooling oil directed against the interior wall surfaces of the piston to maintain adequate cooling of the piston walls.

In conjunction with continuing engine improvements accompanied by a further increase in cylinder power output and a resultant increase in thermal loading on the pistons, it was determined that even greater cooling effectiveness should be provided in the piston crown at the location of the annular arcuately curved wall, or radius, at the inner edge of the crown rim which joins the surrounding planar squish land with the outer portions of the recessed combustion bowl. This "rim radius" portion of the piston is generally the hottest area in the crown of a direct injection diesel engine piston utilizing a symmetrical fuel spray pattern. This is partly because the fuel spray pattern and the combustion bowl configuration direct the major portion of combustion into the outer reaches of the combustion chamber. Then downward motion of the piston during the power stroke results in a high speed turbulent flow of extremely hot gas outward over the rim to fill the space between the piston squish land and the cylinder head as the piston moves away from the head which defines the cylinder closed end. Added to this is the relative difficulty of cooling a salient corner of the piston crown wall which has a much greater surface area exposed on the hot combustion chamber side than is exposed to coolant in the piston undercrown. In short, the rim radius lies in an area of high heat input to the piston and, due to the piston geometry, it is difficult to cool.

If the temperature of a piston becomes excessive during operation at maximum power settings of an engine, the interior surface may become hot enough to partially oxidize the cooling oil and create carbon deposits on the interior surfaces in the high temperature crown rim. The carbon layer built up thereby reduces the effectiveness of oil cooling and further raises the rim surface temperature. This may result in physical and metallurgical effects which eventually produce surface cracking in the area of the hot rim radius and may result in limiting the life of the piston.

SUMMARY OF THE INVENTION

The present invention provides solutions to the piston rim radius cooling problem by increasing convective and conductive heat transfer from the rim area in order to minimize the formation of undercrown carbon deposit layers and to mitigate the effects of any layer which may form. Among the results of the inventive designs employed to accomplish these purposes are the provision of increased interior cooling surface area relative to the exterior area provided by increasing the rim radius and adding interior fins. In addition, selective increases are provided in the undercrown thickness leading away from the rim radius to conduct additional heat away from the rim. Moreover a change in the exterior configuration at the rim radius, involving an angular break or discontinuity in the curvature at its juncture with the squish land, is provided to recapture a loss in turbulence related engine performance occasioned by increasing the rim radius.

These and other features and advantages of the invention will be more fully understood from the following description of certain preferred embodiments taken together with the accompanying drawings.

BRIEF DRAWING DESCRIPTION

DETAILED DESCRIPTION

Figure 1:
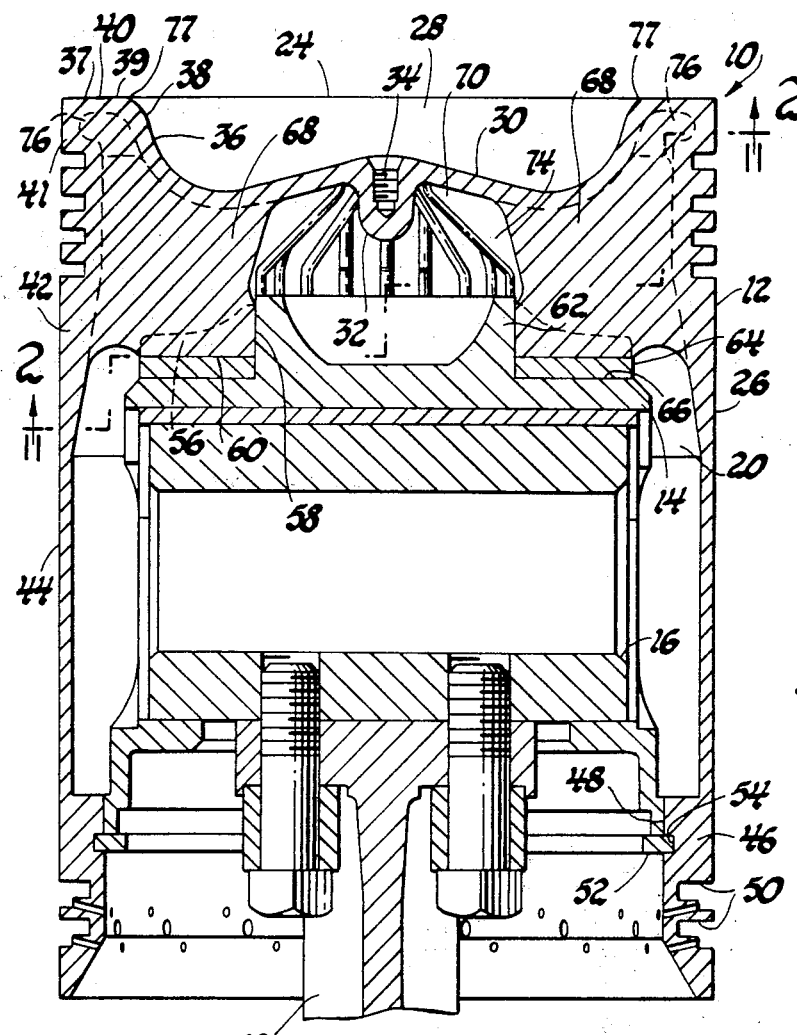
FIG. 1 is a cross-sectional view of a two piece piston assembly embodying the invention and including a hollow piston member rotatably mounted on a thrust load receiving carrier.
Figure 3:
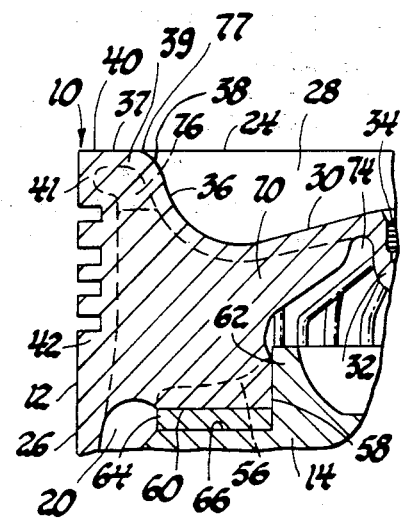
FIG. 3 is a fragmentary cross-sectional view of the assembly of FIGS. 1 and 2 from the plane indicated by the line 3—3 of FIG. 2.
Figure 4:
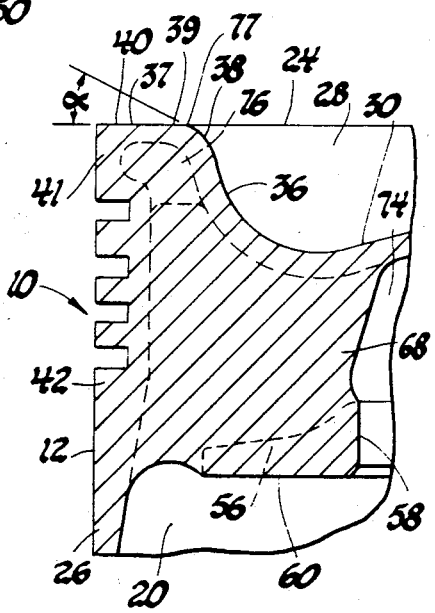
FIG. 4 is an enlarged fragmentary view of a portion of the hollow piston member of FIG. 1 provided to illustrate more clearly certain features of the invention.
Figure 2:
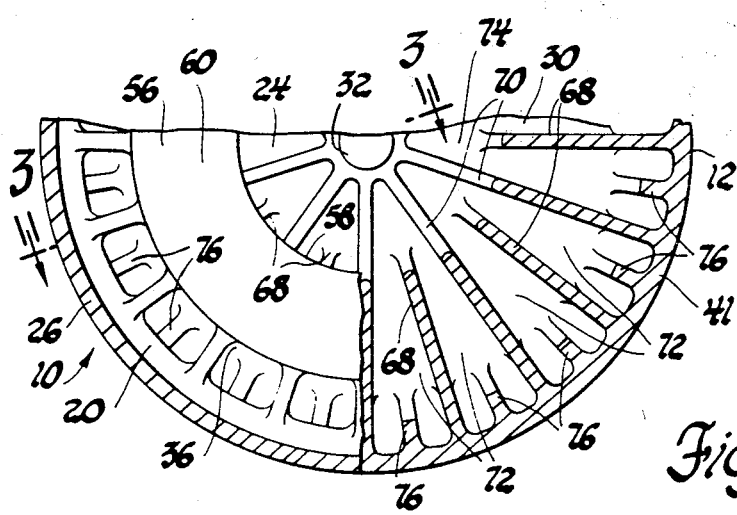
FIG. 2 is a partial transverse cross-sectional view of the hollow piston member as seen from the planes indicated by the line 2—2 of FIG. 1 viewed in the direction of the arrows.

Referring first to FIGS. 1 through 4 of the drawings, numeral 10 generally indicates a two piece piston assembly particularly intended for use in a turbocharged two cycle direct injection internal combustion engine of the compression ignition (diesel) type. Assembly 10 includes a substantially hollow outer piston member 12 which is supported to freely float (rotate) on an inner piston carrier 14. The carrier is in turn pivotally connected by a trunnion pin 16 to the upper end of a connecting rod 18.

The piston and carrier members 12, 14 form a chamber 20 therebetween which is normally supplied with piston cooling oil through a passage not shown, extending upwardly through the carrier. In an assembled engine, the lower end of this passage is aligned to receive a jet of cooling oil emanating from a suitable nozzle or orifice connected in known manner with an oil distribution manifold, not shown, that extends longitudinally of the engine crankcase. Drain means not shown in the carrier allow the return of excess oil to the engine supply sump, thus providing a continuous flow.

The hollow piston 12 is closed at its upper end to form a thin-walled crown or head portion 24. A cylindrical wall portion 26 extends longitudinally from this closed end portion 24. The head of the piston is recessed to form an open semi-turbulent toroidal combustion chamber bowl 28. This bowl has a shallow conical bottom wall 30 which extends radially outwardly from a depending central puller boss 32. A threaded bore 34 is provided in the boss for engagement by a suitable pulling tool.

The edge of the bowl 28 is formed by a curved side wall 36, the upper edge of which is connected to a short radial wall portion 37 by a radiused or arcuate curved annular wall which is commonly known as the rim radius 38. This radius, together with the radial wall portion 37 define a hollow peripheral rim 39 for the piston crown surrounding the recessed combustion bowl 28. The radial wall portion 37 itself includes a planar outer surface or squish land 40 extending from the outer diameter of the piston inwardly to the rim radius. The squish land 40 coacts with an opposing cylinder head, not shown, which defines the end of the combustion chamber, to squeeze out portions of the charge during the upstroke of the piston and create a rapid inflow or squish of gases into the toroidal combustion bowl that causes substantial combustion-promoting turbulence.

The outer edge of the rim 39 connects with the upper end of the cylindrical wall portion 26 of the piston which comprises a heat dam 41 formed as a relatively thin short annular portion of the cylindrical wall. Below the heat dam is a thickened ring mounting portion, or ring belt 42, which is outwardly grooved to receive four longitudinally spaced compression rings, not shown. The purpose of the heat dam 41 is to restrict the conduction of heat from the piston combustion bowl and rim to the ring belt section 42 so as to prevent the piston rings from being exposed to excessive temperatures.

Below the ring belt 42 there is a thinner cylindrical skirt 44 which extends longitudinally downward terminating at its lower end in a thickened portion 46 on which there is formed internally an annular thrust surface 48 for the lower edge of the carrier 14. Below the thrust surface, piston skirt 44 is externally grooved at 50 to receive a pair of oil control rings not shown. A snap ring 52 is received in an internal groove 54 of portion 46 for the purpose of retaining the piston 12 and the piston carrier 14 in assembly.

The interior structure of the piston 12 includes an annular thrust collar 56. This collar is supported longitudinally and coaxially of the piston head 24 and extends normally of the common longitudinal axis of the piston and carrier. The collar 56 is spaced within the lower edge of the ring belt 42 and is concentrically embraced thereby. The central opening through the collar is finished to form a cylindrical bearing surface 58 while the lower surface of the collar is likewise finished to form an annular bearing surface 60. Cylindrical surface 58 is engaged by a mating journal surface formed on a boss 62 centrally disposed at the upper end of the carrier. A separate thrust washer 64 is disposed around the boss 62 and between the annular surface 60 of the piston thrust collar and a mating bearing surface 66 on the upper end of the carrier 14.

The annular thrust collar 56 is structurally connected with the piston bowl and rim, comprising the piston crown, and with the heat dam and ring belt portions of the cylindrical skirt wall by a plurality of integrally formed alternately and equiangularly disposed radially and longitudinally extending imperforate planar gussets 68, 70. Gussets 68 extend upward from the inner edge of the annular collar, being arched inwardly very slightly with a small radius at their juncture with the combustion bowl wall 30. Gussets 70 are angled inwardly from a point above the inner edge of the collar member and extend to radiused connection with the combustion bowl wall, terminating adjacent the central bowl boss 32 so that the inner portion of the combustion bowl wall is supported by these gussets.

Gussets 68, 70 divide the upper portion of chamber 20 in the hollow piston 12 into a plurality of wedge shaped spaces 72. The spaces 72 are open at their inner edges to a central section 74 and are connected to the lower portion of chamber 20 through their lower edges which are open between the thrust collar 56 and the ring belt 42.

Within spaces 72 and equally spaced intermediate the gussets 68, 70, a plurality of shallow cooling ribs 76 are disposed in the hollow rim portion of the piston. These ribs connect the outer surface of the piston bowl with the inner surface of the cylindrical wall upper end defined by the heat dam at the upper end of the ring belt. Ribs 76 like the gussets 68, 70 are thin in cross section so as to act as cooling fins which carry the heat away from the combustion bowl and piston rim surfaces and distribute it to the cooling oil without acting as paths for the excessive transmission of heat from the combustion bowl directly to the piston ring belt.

In operation, the reciprocating action of the piston assembly causes the cooling oil supplied to the chamber 20 to be agitated in a cocktail shaker fashion up and down over the surfaces of the piston walls, the gussets and the cooling ribs so as to perform a scrubbing action which effectively carries away heat from the inner walls of the combustion bowl and rim as well as from the heat dam and ring areas, maintaining their operating temperatures at reasonable levels.

The foregoing portion of the description has described those aspects of the present invention which are essentially like those of the prior art piston arrangement shown in the previously mentioned Canadian patent No. 963,752, the disclosure of which is incorporated herein by reference. The embodiment of FIGS. 1-4 was modified from the prior arrangement of Canadian patent No. 963,752 in the following manner.

The rim radius 38 was first increased 50% to provide a more moderate curvature of the arcuately curved wall joining the squish land 40 with the side wall 36 of the combustion bowl 28. To maintain the original rim thickness in the improved design, an equivalent dimensional increase in the interior radius was also made. To maintain the squish land width equal to that of the previous piston design, the combustion bowl was revised to a configuration somewhat deeper and of smaller diameter.

The increased rim radius had the desired effect of providing a substantial increase in the relative cooling area available on the interior of the rim radius portions of the piston wall as compared to the heat receiving portions of the wall on the outer surface in the rim radius. Accordingly, substantially improved cooling of the hot rim radius was provided. However, the operating result was a small, but significant, loss of fuel efficiency which apparently resulted from reduced turbulence caused by the increase in the rim radius. One theory charged the loss to a Coanda effect which, due to the more moderate rim radius, caused more of the squish gases to follow the contour of the bowl wall with a resulting decrease in the amount of turbulence.

After consideration of a number of alternatives, a modification was made which restored the fuel efficiency loss without decreasing the cooling effectiveness of the modified piston structure. This was accomplished by moving the center of the rim radius slightly closer to the top of the piston so that the outer surface of the radius no longer lay tangent with the planar outer surface forming the squish land. Instead the rim radius intersects the squish land with a sharp edge or angular break 77 defining an angle α (shown in FIG. 4) which in the presently preferred embodiment, equals about 27°. At present, it is considered preferable that the angle α have a value within the range from 25° to 30°. However a smaller angle α of 20° may be adequate to provide a performance improving effect. The physical results of this change included not only the provision of the angular break in the rim curvature where it intersects the squish land but also an increase in the width of the squish land itself, so that it is not at present clear whether the improved fuel efficiency stems primarily from the Coanda effect opposing characteristics of the angular break or from the additional squish effectiveness of the wider squish land.

In physically comparing the improved piston rim and bowl configuration with that of the prior design, the following dimensional characteristics are believed significant. The combustion bowl rim radius at the outer surface was increased from about 4.2% of the piston diameter to about 6.2% of the piston diameter and from 5.7% of the previous bowl diameter to about 8.4% of the new slightly smaller bowl diameter. With related changes in the inner rim radius, the minimum wall thickness at the rim radius was maintained essentially constant but the ratio of the outer to inner surface areas $s_o/s_i$ was reduced from about 2.4 to less than 1.7 in the new design. This could decrease the temperature difference across the wall over 40% for the same heat flow. Also the width of the squish land was increased from about 7.8% of the piston diameter in the previous design to about 10.2% of the piston diameter in the new preferred embodiment. Comparatively, in the previous embodiment, the width of the planar portion defining the squish land equalled about 10% of the piston bowl diameter while, in the revised preferred embodiment, the wider squish land equals about 14% of the new slightly smaller combustion bowl diameter. It should be recognized that these figures are nominal and subject to substantial variation due to drawing and manufacturing tolerances. However, the tendencies indicated by these changes are nevertheless significant.

Figure 5:
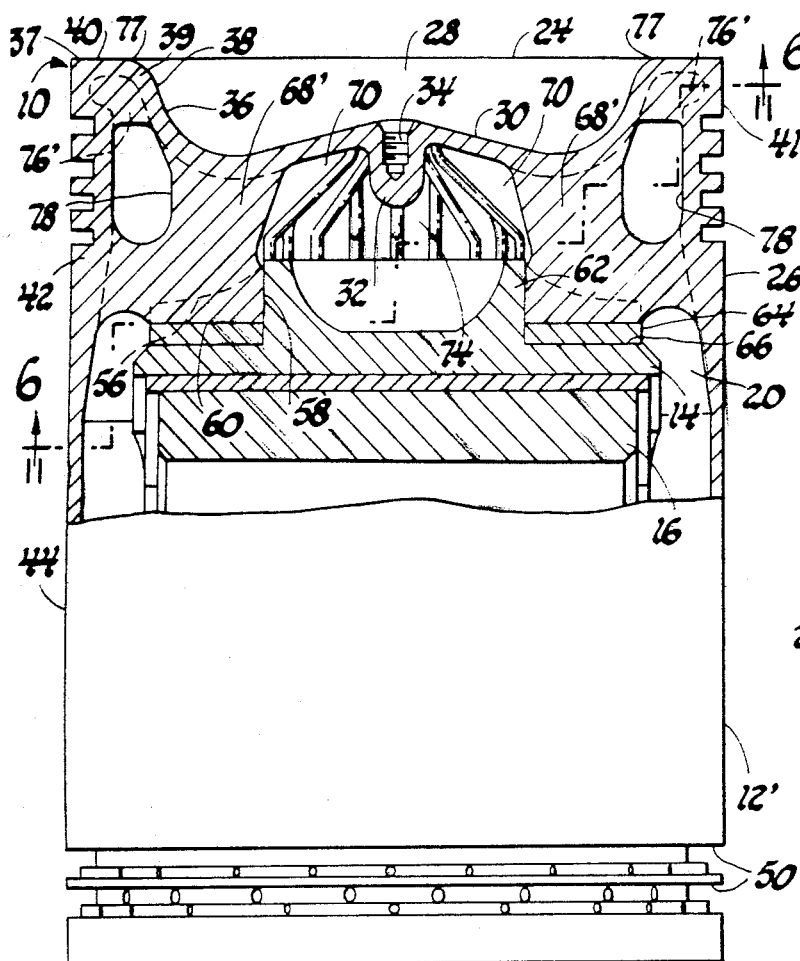
FIGS. 5 through 8 are cross-sectional views of types corresponding respectively to those of FIGS. 1 through 4 but illustrating a modified piston arrangement incorporating additional features of the present invention.
Figure 7:
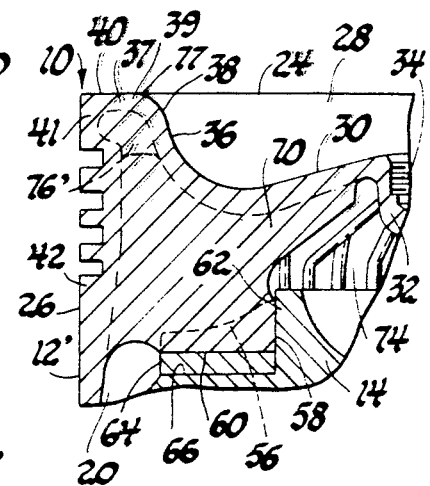
Figure 6:
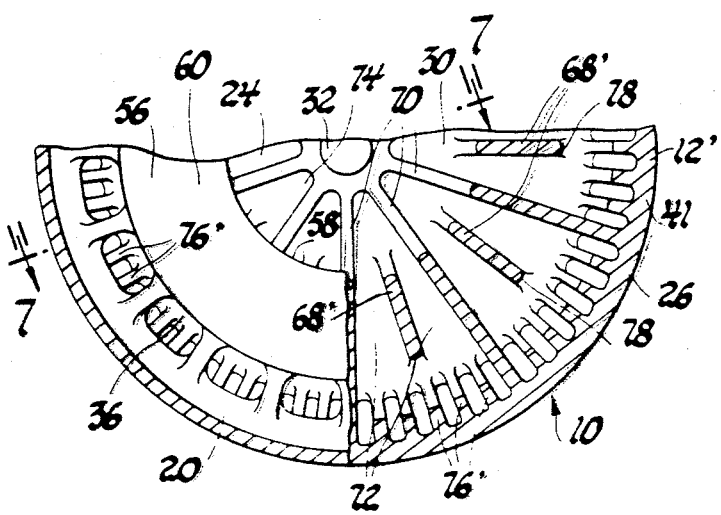
Figure 8:
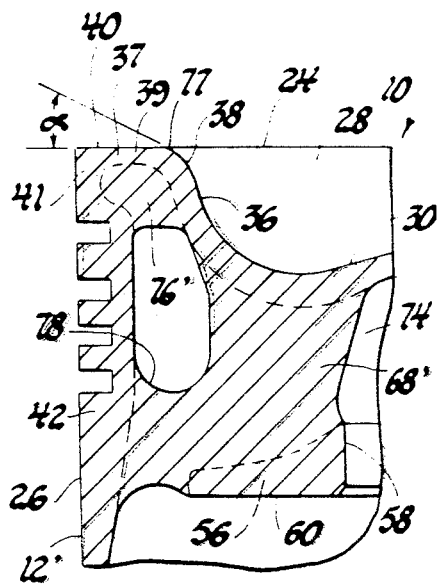

Turning now to FIGS. 5-8 of the drawings, there is shown an alternative embodiment of piston assembly including a hollow piston member incorporating the previously described features of the present invention as well as certain additional features. Since the construction of the assembly and the piston member illustrated in FIGS. 5-8 is largely identical to that of the construction of FIGS. 1-4, like reference numerals have been used for like elements or parts, the construction of which will be understood from the description of the embodiment of FIGS. 1-4 which will not be repeated. Instead the embodiment of FIGS. 5-8 will be described by reference to its differences from the first described embodiment, utilizing primed numerals for modified elements or parts.

In the FIGS. 5-8 embodiment, the thickness of the crown bowl wall is varied beginning with a thin cross section equal to the previous embodiment at the rim radius where maximum cooling is desired. The wall thickness is then increased down the bowl periphery toward the thickest portion at the bottom of the bowl, which is directly supported by the radial gussets 68', 70. The wall thickness then is reduced inwardly toward the central puller boss 32 at which point it again has the thickness provided in the embodiment of FIG. 1. The thickened toroidal central portion of the bowl wall is provided to draw heat from the peripheral bowl portions, particularly the rim radius but also from the central portions of the bowl, toward the intermediate annular portion for delivery to the cooling oil and to the supporting gussets which provide additional cooling surface that is directly cooled by the cooling oil. This thickened wall construction is, however, similar to that used for a similar purpose in the piston construction illustrated in the previously mentioned U.S. Pat. No. 3,240,193, the disclosure of which is hereby incorporated by reference.

Another difference in the alternative embodiment is the provision of perforate gussets 68' lying between and, in the present embodiment, alternating with the imperforate gussets 70, which are similar to those of the previously described embodiment. The perforate gussets 68' differ from those of the previous embodiment in the provision of openings 78 adjacent the cylindrical wall, the rim and outer portions of the combustion chamber bowl. These openings separate the perforate gussets 68' from these portions of the piston wall, leaving the perforate gussets connected only to the intermediate, or lower, portions of the piston bowl and to the cylindrical wall at the lower portions of the ring belt.

The purpose of providing these openings 78 in the gussets 68' is to permit the casting of additional thinner ribs 76' which are preferably equally spaced circumferentially between the imperforate gussets 70. The construction is such that, with ten equally spaced imperforate gussets 70 which are found in both illustrated embodiments of the piston, the openings in the perforate gussets 68' allow the provision of 5 cooling ribs 76' in the space between adjacent imperforate gussets. This compares with the arrangement of FIGS. 1-4 in which limitations of the casting process permit only 2 cooling ribs and 1 imperforate gusset 68 to occupy the same space where 5 cooling ribs are located in the embodiment of FIGS. 5–8. The purpose of the additional cooling ribs is, of course, to provide additional undercrown surface for conducting heat from the piston rim, including the radius, to the cooling oil to provide even better cooling of this difficult to cool zone.

While it is recognized that the use of rim cooling ribs separate from the crown supporting structure of a piston is not in itself new, it is believed that the present invention provides a novel combination of piston crown support structure which combines the advantageous effects of the structurally stiff imperforate gusset construction provided by the multiple gussets 70 with the increasing cooling provided by a greater number of cooling ribs as permitted by the openings in the alternate perforate gussets 68' spaced intermediate the imperforate gussets to aid in further stiffening and structurally supporting the piston crown structure while providing additional paths for heat flow from the crown to the piston cooling oil. In addition, the improvements provided in pistons having the embodiment of FIGS. 5–8 are combined with the larger radius rim curvature and the combustion improving angular break of the previously described piston embodiment to yield a construction having even more improved cooling in the critical rim area while maintaining the necessary structural rigidity to maintain durability in extended operation under high load conditions.

While the invention has been disclosed by reference to certain embodiments selected for purposes of illustration, it should be understood that numerous changes could be made within the spirit and scope of the inventive concepts described. Accordingly, it is intended that the invention not be limited to the described embodiments but that it have the full scope permitted by the language of the following claims.

The embodiments of the invention in which an exclusive property or privilege is claimed are defined as follows.

1. An oil cooled piston for an internal combustion engine, said piston having a hollow body with a closed head end, said end being centrally recessed to form a thin-walled combustion chamber bowl outwardly embraced by a hollow rim including a thin-walled radial portion having a planar outer surface comprising an annular squish land, heat conducting means within said hollow body and connecting with said bowl and rim, said head end and said heat conducting means being adapted to be contacted by cooling oil supplied to the hollow body interior to cool said head end by removing heat from the thin-walled areas and the connecting heat conducting means, said hollow rim including an annular curved wall of relatively constant thickness and curvature, said curved wall being smoothly joined with and continuously connecting an upwardly sweeping outer periphery of said combustion bowl with an inner edge of said squish land, characterized by said wall curvature convexly extending away from the axis of the piston and being moderate so as not to unduly restrict cooling of the outer surface through the opposite coolant-exposed inner surface area but of less than desired sharpness for promoting squish-caused combustion chamber turbulence, said curved wall being joined to the squish land at said inner edge by an angular break in the curvature to promote separation of squish flow from the rim surface and improve combustion turbulence.

2. An oil cooled piston for an internal combustion engine, said piston having a hollow body with a closed head end, said end being centrally recessed to form a thin-walled combustion chamber bowl outwardly embraced by a hollow rim including a thin-walled radial portion having a planar outer surface comprising an annular squish land, heat conducting means within said hollow body and connecting with said bowl and rim, said head end and said heat conducting means being adapted to be contacted by cooling oil supplied to the hollow body interior to cool said head end by removing heat from the thin-walled areas and the connecting heat conducting means, said hollow rim including an annular arcuately curved wall of relatively constant thickness and curvature, said curved wall being smoothly joined with and continuously connecting an upwardly sweeping outer periphery of said combustion bowl with an inner edge of said squish land, characterized by said wall curvature convexly extending away from the axis of the piston and being moderate so as not to unduly restrict cooling of the outer surface through the opposite coolant-exposed inner surface area, said curved wall being joined to the squish land at said inner edge by an angular break of at least 20° in the curvature to promote separation of squish flow from the rim surface and improve combustion turbulence and wherein said curved wall has an exterior radius at least equal to 5% of the diameter of said piston and said squish land has a width equal to at least 9% of such piston diameter.

3. An oil cooled piston for a two-cycle direct injection diesel engine, said piston having a hollow body with a closed head end, said end being centrally recessed to form a thin-walled combustion chamber bowl outwardly embraced by a hollow rim including a thin-walled radial portion having a planar outer surface comprising an annular squish land, heat conducting means within said hollow body and connecting with said bowl and rim, said head end and said heat conducting means being adapted to be contacted by cooling oil supplied to the hollow body interior to cool said head end by removing heat from the thin-walled bowl and rim areas and the connecting heat conducting means, said hollow rim including an annular curved wall of relatively constant thickness and curvature, said curved wall being smoothly joined with and continuously connecting an upwardly sweeping outer periphery of said combustion bowl with an inner edge of said squish land, characterized by said wall curvature convexly extending away from the axis of the piston and being moderate so as not to unduly restrict cooling of the outer surface through the opposite coolant-exposed inner surface area but of less than desired sharpness for promotion squish-caused combustion chamber turbulence, said curved wall being joined to the squish land at said inner edge by an angular break in the curvature in the range of from 25° to 30° to promote separation of squish flow from the rim surface and improve combustion turbulence.

4. An oil cooled piston for an internal combustion engine, said piston having a hollow body with a closed head end, said end being centrally recessed to form a thin-walled combustion chamber bowl outwardly embraced by a hollow rim including a thin-walled radial portion having a planar outer surface comprising an annular squish land, heat conducting means within said hollow body and connecting with said bowl and rim, said head end and said heat conducting means being adapted to be contacted by cooling oil supplied to the hollow body interior to cool said head end by removing heat from the thin-walled areas and the connecting heat conducting means, said hollow rim including an annular arcuately curved wall of relatively constant thickness and curvature, said curved wall being smoothly joined with and continuously connecting an upwardly sweeping outer periphery of said combustion bowl with an inner edge of said squish land, characterized by said wall curvature convexly extending away from the axis of the piston and being moderate so as not to unduly restrict cooling of the outer surface through the opposite coolant-exposed inner surface area but of less than desired sharpness for promoting squish-caused combustion chamber turbulence, said curved wall being joined to the squish land at said inner edge by an angular break in the curvature to promote separation of squish flow from the rim surface and improve combustion turbulence, wherein the ratio of the corresponding exterior to interior surfaces of the piston at said curved wall is less than 2, said angular break has an angle in the range of from 25° to 30°, said curved wall has an exterior radius in the range of from 7 to 10% of the piston bowl diameter and said squish land has a width in the range of from 12 to 16% of the piston bowl diameter.

5. An oil cooled floating piston for an internal combustion engine, said piston having a hollow body with a closed head end adapted to be cooled by oil supplied to the hollow body interior, said end being centrally recessed to form a thin-walled combustion chamber bowl outwardly embraced by a hollow rim including a thin-walled radial portion having a planar outer surface comprising an annular squish land, and an annular curved wall of relatively constant thickness and curvature, said curved wall being smoothly joined with and continuously connecting an upwardly sweeping outer periphery of said combustion bowl with an inner edge of said squish land, a cylindrical wall depending from said rim, and an annular thrust collar supported concentrically of said cylinder wall and coaxially of the head end by a plurality of relatively thin, load transmitting and heat conducting gussets extending radially outwardly and longitudinally upwardly from the upper surface of said collar and a plurality of depending ribs connecting portions of the combustion bowl and cylindrical wall with the rim to aid in cooling and strengthening the piston rim area, said gussets and said ribs acting to carry heat from the combustion bowl to coolant supplied to the interior of said hollow body, said piston being characterized by the curvature of said annular curved wall convexly extending away from the axis of the piston and being moderate so as not to unduly restrict cooling of the outer surface through the opposite coolant-exposed inner surface area but of less than desired sharpness for promoting squish-caused combustion chamber turbulence, said curved wall being joined to the squish land at said inner edge by an angular break in the curvature to promote separation of squish flow from the rim surface and improve combustion turbulence, said gussets including circumferentially equally spaced imperforate gussets and intermediate perforate gussets spaced circumferentially between said imperforate gussets connecting with and rigidly tying together the inner surfaces of said head end and said cylindrical wall, said perforate gussets similarly connecting said head end and distal portions of said cylindrical wall but having openings adjacent upper portions of the cylindrical wall, the rim and outer portions of the combustion chamber bowl, said ribs being spaced intermediate said imperforate gussets and spaced from the edges of the openings through said perforate gussets, said openings in the perforate gussets being so formed as to permit the provision of a greater number of said cooling ribs with closer spacing to be formed between the imperforate gussets during casting of the piston hollow body by reason of the location of such ribs within the openings irrespective of the location of the perforate gussets so as to further increase the cooling capacity in the rim area of the piston head end.

* * * * *